(12) United States Patent
Maruo et al.

(10) Patent No.: US 12,311,402 B2
(45) Date of Patent: May 27, 2025

(54) INTERMITTENT VALVE AND INTERMITTENT COATING APPARATUS

(71) Applicant: Panasonic Intellectual Property Management Co., Ltd., Osaka (JP)

(72) Inventors: Takanori Maruo, Osaka (JP); Keisuke Wakiya, Osaka (JP); Amiri Kisaragi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 588 days.

(21) Appl. No.: 17/605,986

(22) PCT Filed: Apr. 24, 2020

(86) PCT No.: PCT/JP2020/017612
§ 371 (c)(1),
(2) Date: Oct. 22, 2021

(87) PCT Pub. No.: WO2020/255559
PCT Pub. Date: Dec. 24, 2020

(65) Prior Publication Data
US 2022/0212225 A1 Jul. 7, 2022

(30) Foreign Application Priority Data
Jun. 18, 2019 (JP) .................................. 2019-112617

(51) Int. Cl.
*B05C 11/10* (2006.01)
*B05C 5/02* (2006.01)
(Continued)

(52) U.S. Cl.
CPC ........ *B05C 11/1028* (2013.01); *B05C 5/0258* (2013.01); *B05C 11/1026* (2013.01);
(Continued)

(58) Field of Classification Search
CPC ............ B05C 11/1026; B05C 11/1028; B05C 5/0245; B05C 5/0258; F16K 11/044
See application file for complete search history.

(56) References Cited

U.S. PATENT DOCUMENTS 3,974,861 A * 8/1976 Goto ....................... F01N 3/227
137/627.5
4,319,607 A * 3/1982 Fields ................... F16K 11/044
137/625.5
(Continued)

FOREIGN PATENT DOCUMENTS

EP           1321700 A2 *  6/2003  ............ F16K 11/044
JP     2001-038276 A      2/2001
(Continued)

OTHER PUBLICATIONS

International Search Report issued in corresponding International Patent Application No. PCT/JP2020/017612, dated Aug. 4, 2020, with English translation.

*Primary Examiner* — Yewebdar T Tadesse
*Assistant Examiner* — Stephen A Kitt
(74) *Attorney, Agent, or Firm* — Rimon P.C.

(57) ABSTRACT

An intermittent valve includes: a valve main unit having: an inflow chamber, a supply chamber and a return chamber; a piston; a supply valve allowing a coating material to flow from the inflow chamber to the supply chamber when the piston is in a first position and blocking the flow when the piston is in a second position; and a return valve blocking the coating material from flowing from the inflow chamber to the return chamber when the piston is in the first position and allows the flow when the piston is in the second position. The valve diameter of the supply valve is 1.53 times or more the valve diameter of the return valve.

3 Claims, 2 Drawing Sheets

(51) Int. Cl.
*F16K 11/044* (2006.01)
*H01M 4/04* (2006.01)
*H01M 4/139* (2010.01)
*H01M 10/0525* (2010.01)

(52) U.S. Cl.
CPC ......... *F16K 11/044* (2013.01); *H01M 4/0404* (2013.01); *H01M 4/139* (2013.01); *H01M 10/0525* (2013.01)

(56) References Cited

U.S. PATENT DOCUMENTS

| | | | | |
|---|---|---|---|---|
| 5,824,156 | A | * 10/1998 | Watanabe | B05C 11/1047 118/410 |
| 2003/0106594 | A1 | * 6/2003 | Saurwein | F16K 11/044 137/625.5 |
| 2004/0159672 | A1 | * 8/2004 | Auber | B05C 5/0225 222/1 |
| 2011/0259437 | A1 | * 10/2011 | Thomasson | F16K 31/002 137/88 |

FOREIGN PATENT DOCUMENTS

| | | |
|---|---|---|
| JP | 2004-216277 A | 8/2004 |
| JP | 2006-051407 A | 2/2006 |

* cited by examiner

INTERMITTENT VALVE AND INTERMITTENT COATING APPARATUS

CROSS-REFERENCE TO RELATED APPLICATIONS

This application is the U.S. National Phase under 35 U.S.C. § 371 of International Patent Application No. PCT/JP2020/017612, filed on Apr. 24, 2020, which in turn claims the benefit of Japanese Application No. 2019-112617, filed on Jun. 18, 2019, the entire disclosures of which applications are incorporated by reference herein.

BACKGROUND

Field of the Invention

The present invention relates to an intermittent valve and an intermittent coating apparatus.

Description of the Related Art

In recent years, shipments of secondary batteries have been increasing with the spread of electric vehicles (EV), hybrid vehicles (HV), plug-in hybrid vehicles (PHV), and the like. In particular, shipments of lithium-ion secondary batteries are increasing. A general secondary battery has a positive electrode plate, a negative electrode plate, a separator, and an electrolytic solution as main components. Electrode plates such as positive electrode plates and negative electrode plates have a structure in which an electrode active material is stacked on the surface of a current collector made of metal foil.

Conventionally, as a method for manufacturing such electrode plates, a method is known that is for intermittently applying an electrode slurry to the surface of long metal foil using an intermittent coating apparatus including: a die for discharging an electrode slurry in which an active material and a solvent are mixed; and an intermittent valve for switching between supply and non-supply of the electrode slurry to the die (see, for example, Patent Literature 1).

Patent Literature: Japanese Patent Application Publication No. 2006-51407

In order to improve the quality of a secondary battery, it is unsurprisingly required to improve the accuracy of applying an electrode slurry in intermittent coating. Meanwhile, as the shipment of secondary batteries increases, there is a demand for shortening the manufacturing time of electrode plates. However, if an electrode slurry is intermittently applied to metal foil at high speed in order to shorten the manufacturing time of an electrode plate, the accuracy of applying the electrode slurry may be lowered.

SUMMARY OF THE INVENTION

In this background, a purpose of the present invention is to provide a technology for improving the accuracy of applying a coating material in intermittent coating.

One embodiment of the present invention relates to an intermittent valve that switches between supply and non-supply of a coating material from a tank for storing the coating material to a die for applying the coating material to a coating target. This intermittent valve includes: a valve main unit having therein: an inflow chamber that has an upstream end, a first downstream end, and a second downstream end in which the tank is connected to the upstream end; a supply chamber that is connected to the first downstream end and the die; and a return chamber that is connected to the second downstream end and the tank; a piston that is capable of switching between a first position and a second position in the valve main unit; a supply valve that is fixed to the piston, allows the coating material to flow from the inflow chamber to the supply chamber when the piston is in the first position, and blocks the flow when the piston is in the second position; and a return valve that is fixed to the piston, blocks the coating material from flowing from the inflow chamber to the return chamber when the piston is in the first position, and allows the flow when the piston is in the second position, wherein the valve diameter of the supply valve is 1.53 times or more the valve diameter of the return valve.

Another embodiment of the present invention relates to an intermittent coating apparatus. This intermittent coating apparatus includes: a tank that stores a coating material; a die that applies the coating material to a coating target; and the intermittent valve according to the above embodiment that switches between supply and non-supply of the coating material to the die.

Optional combinations of the aforementioned constituting elements, and implementations of the invention in the form of methods, apparatuses, and systems may also be practiced as additional modes of the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
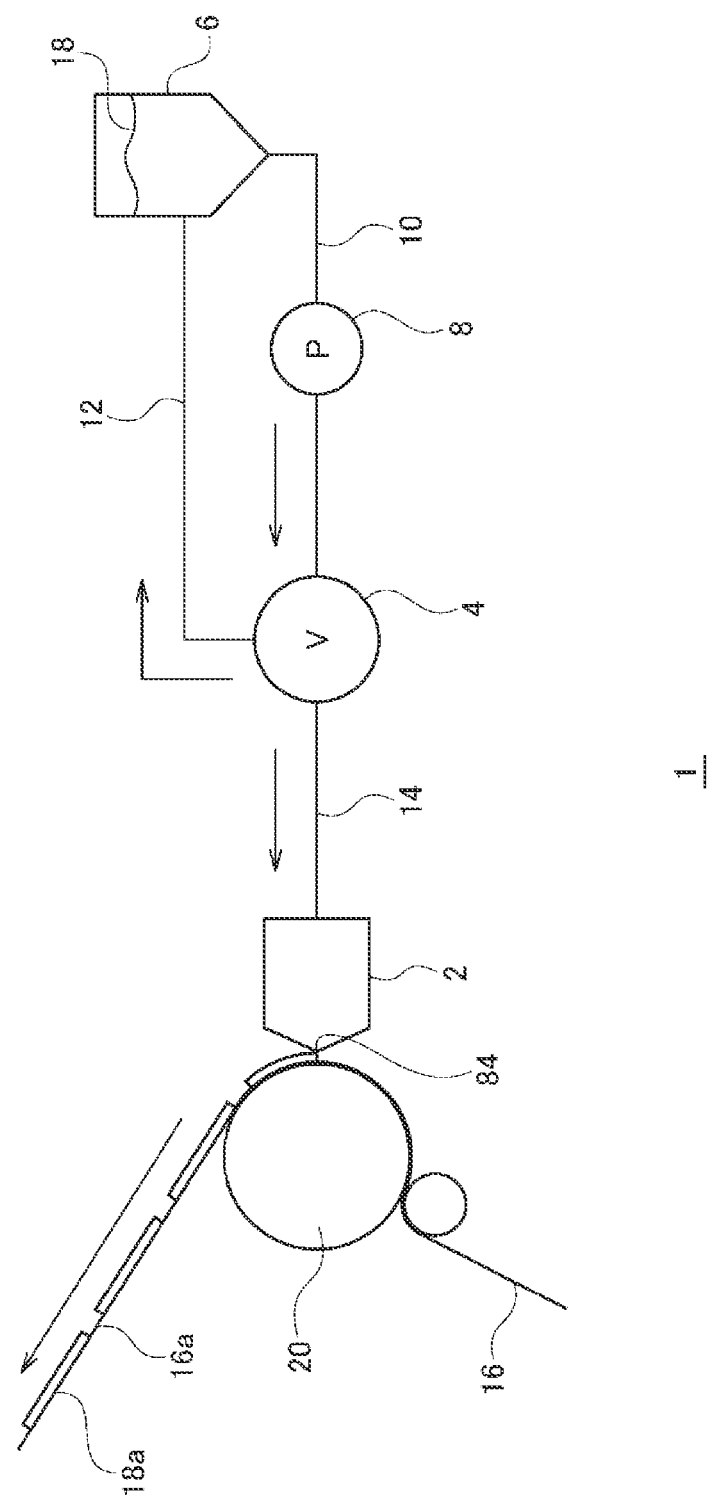
FIG. 1 is a schematic diagram of an intermittent coating apparatus according to an embodiment.

Hereinafter, the present invention will be described based on preferred embodiments with reference to the drawings. The embodiments do not limit the invention and are shown for illustrative purposes, and not all the features described in the embodiments and combinations thereof are necessarily essential to the invention. The same or equivalent constituting elements, members, and processes illustrated in each drawing shall be denoted by the same reference numerals, and duplicative explanations will be omitted appropriately.

The scales and shapes shown in the figures are defined for convenience's sake to make the explanation easy and shall not be interpreted limitatively unless otherwise specified. Terms like "first", "second", etc., used in the specification and claims do not indicate an order or importance by any means unless specified otherwise and are used to distinguish a certain feature from the others. Those of the members that are not important in describing the embodiment are omitted from the drawings.

FIG. 1 is a schematic diagram of an intermittent coating apparatus according to an embodiment. An intermittent coating apparatus 1 includes a die 2, an intermittent valve 4, a tank 6, a pump 8, a feed line 10, a return line 12, and a die supply line 14.

The die 2 is an instrument for applying a coating material 18 to a coating target 16. The intermittent coating apparatus 1 according to the present embodiment is used for manufacturing an electrode plate of a secondary battery. The electrode plate of a secondary battery is a sheet-shaped electrode material obtained by applying an electrode slurry to a current collector and then drying the electrode slurry. Therefore, in the present embodiment, the coating target 16 is a current collector of the secondary battery, and the coating material 18 is the electrode slurry of the secondary battery. The current collector is, for example, metal foil. The electrode slurry is, for example, a mixture of a positive electrode active material or a negative electrode active material and a solvent. In the case of a commonly-used lithium ion secondary battery, a positive electrode plate is produced by applying a slurry containing a positive electrode active material such as lithium cobalt oxide or lithium iron phosphate on aluminum foil. Further, the electrode plate of the negative electrode is produced by applying a slurry containing a negative electrode active material such as graphite on copper foil.

The die 2 is arranged such that a discharge port 84 faces the peripheral surface of a backup roll 20 at a predetermined distance. The coating target 16 is continuously conveyed to a position where the backup roll 20 and the discharge port 84 face each other by the rotation of the backup roll 20.

The intermittent valve 4 is connected to the die 2 via the die supply line 14. The intermittent valve 4 is a mechanism for switching between supply and non-supply of the coating material 18 to the die 2. While the coating material 18 is being supplied to the die 2, the intermittent coating apparatus 1 can discharge the coating material 18 from the die 2 to the coating target 16. The tank 6 is connected to the intermittent valve 4 via the feed line 10 and the return line 12.

The tank 6 stores the coating material 18. The pump 8 is provided in the feed line 10, and the coating material 18 is sent from the tank 6 to the intermittent valve 4 by the driving of the pump 8. The intermittent valve 4 supplies the coating material 18 supplied from the tank 6 to the die 2 via the die supply line 14. Alternatively, the intermittent valve 4 returns the coating material 18 supplied from the tank 6 to the tank 6 via the return line 12.

The intermittent valve 4 supplies the coating material 18 to the die 2. Thereby, the coating material 18 can be discharged from the die 2 so as to form a coated part 18*a* with the coating material 18 on the coating target 16. Further, the intermittent valve 4 returns the coating material 18 to the tank 6. Thereby, the discharge of the coating material 18 from the die 2 can be stopped so as to form an uncoated part 16*a* without the coating material 18 on the coating target 16. In other words, the intermittent valve 4 allows for intermittent application of the coating material 18 to the coating target 16. The uncoated part 16*a* is used for attaching the center lead of an electrode or the like.

Figure 2:
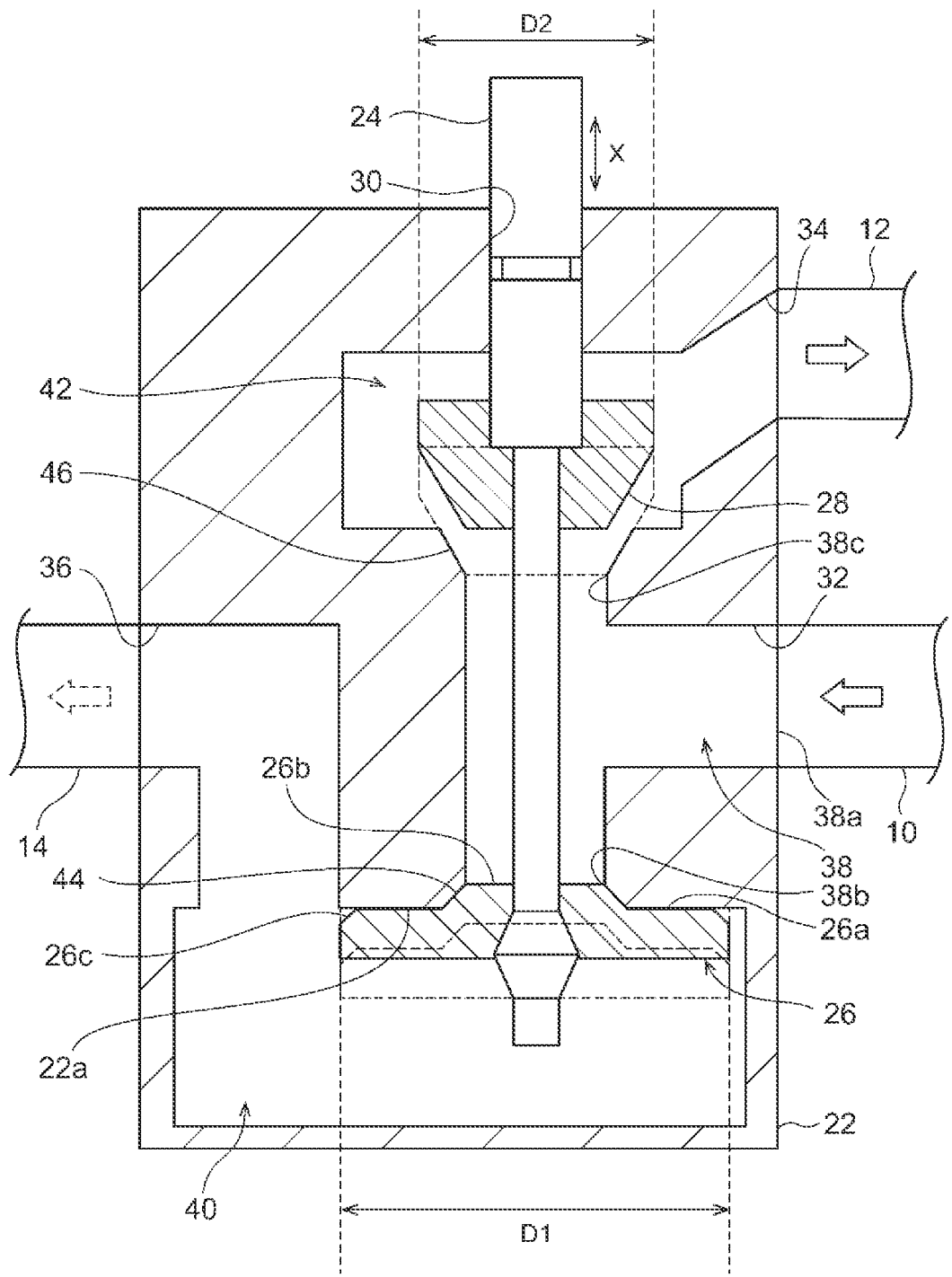
FIG. 2 is a cross-sectional view schematically showing an intermittent valve.

FIG. 2 is a cross-sectional view schematically showing the intermittent valve 4. The intermittent valve 4 includes a valve main unit 22, a piston 24, a supply valve 26, and a return valve 28. The valve main unit 22 is a so-called cylinder, has a first opening 30 through which the piston 24 is slidably inserted on the upper surface, and has a second opening 32 to which the feed line 10 is connected, a third opening 34 to which the return line 12 is connected, and a fourth opening 36 to which the die supply line 14 is connected on the side surface. In the explanation of the present embodiment, for convenience, the first opening 30 is provided on the upper surface and the second opening 32 through the fourth opening 36 are provided on the side surface. However, the orientation of the intermittent valve 4 is not particularly limited.

Further, the valve main unit 22 has an inflow chamber 38, a supply chamber 40, and a return chamber 42 in the inside thereof. The inflow chamber 38 is a substantially T-shaped chamber in which one end part side is branched into two and has an upstream end 38*a*, a first downstream end 38*b*, and a second downstream end 38*c*. The feed line 10 is connected to the upstream end 38*a* via the second opening 32. In other words, the tank 6 is connected to the upstream end 38*a*. The coating material 18 flows into the inflow chamber 38 from the upstream end 38*a* and flows toward the first downstream end 38*b* and the second downstream end 38*c* in the inflow chamber 38.

The supply chamber 40 is connected to the first downstream end 38*b*. The die supply line 14 is connected to the supply chamber 40 via the fourth opening 36. That is, the supply chamber 40 is connected to the die 2. The coating material 18 that has flowed through the inflow chamber 38 and reached the first downstream end 38*b* flows to the die 2 via the supply chamber 40 and the die supply line 14. Therefore, the inflow chamber 38 and the supply chamber 40 form a part of the flow path of the coating material 18 connecting the tank 6 and the die 2.

The return chamber 42 is connected to the second downstream end 38*c*. The return line 12 is connected to the return chamber 42 via the third opening 34. That is, the return chamber 42 is connected to the tank 6. The coating material 18 that has flowed through the inflow chamber 38 and reached the second downstream end 38*c* flows into the tank 6 via the return chamber 42 and the return line 12. Therefore, the inflow chamber 38 and the return chamber 42 form a part of the flow path through which the coating material 18 circulates between the tank 6 and the intermittent valve 4.

The first opening 30 of the valve main unit 22, a first connecting part 44 connecting the first downstream end 38*b* and the supply chamber 40, and a second connecting part 46 connecting the second downstream end 38*c* and the return chamber 42 are arranged to be lined up on a straight line. The first opening 30, the second connecting part 46, and the first connecting part 44 are disposed in the order stated. The piston 24 is a rod-shaped member, and one end side thereof is inserted into the first opening 30, the second connecting part 46, and the first connecting part 44.

The supply valve 26 is fixed near the first connecting part 44 of the piston 24. The return valve 28 is fixed near the second connecting part 46 of the piston 24. The supply valve 26 and the return valve 28 are arranged such that the distance between the supply valve 26 and the return valve 28 in the axial direction X of the piston 24 (the direction in which the axial center of the piston 24 extends) is wider than the distance between the first connecting part 44 and the second connecting part 46. The supply valve 26, the return valve 28, the opening of the first connecting part 44, and the opening of the second connecting part 46 according to the present embodiment are each circular when viewed from the axial direction X.

The piston 24 is capable of switching between a first position and a second position in the valve main unit 22 by being displaced in the axial direction X with respect to the valve main unit 22. The piston 24 is in the first position when the piston 24 enters the valve main unit 22 further inside compared to when the piston 24 is in the second position and is in the second position when the piston 24 exits the valve main unit 22 further outside compared to when the piston 24 is in the first position. In FIG. 2, the piston 24, the supply valve 26, and the return valve 28 at the second position are shown by solid lines. Further, the supply valve 26 and the return valve 28 when the piston 24 is in the first position are shown by broken lines.

When the piston 24 is in the first position, a gap is formed between the supply valve 26 and the first connecting part 44, allowing the inflow chamber 38 and the supply chamber 40 to communicate with each other. On the other hand, when the piston 24 is in the second position, the supply valve 26 fits into the first connecting part 44, blocking the inflow chamber 38 and the supply chamber 40. Therefore, the supply valve 26 allows the coating material 18 to flow from the inflow chamber 38 to the supply chamber 40 when the piston 24 is in the first position and blocks the coating material 18 from flowing from the inflow chamber 38 to the supply chamber 40 when the piston 24 is in the second position.

Further, when the piston 24 is in the first position, the return valve 28 fits into the second connecting part 46, blocking the inflow chamber 38 and the return chamber 42. On the other hand, when the piston 24 is in the second position, a gap is formed between the return valve 28 and the second connecting part 46, allowing the inflow chamber 38 and the return chamber 42 to communicate with each other. Therefore, the return valve 28 blocks the coating material 18 from flowing from the inflow chamber 38 to the return chamber 42 when the piston 24 is in the first position and allows the coating material 18 to flow from the inflow chamber 38 to the return chamber 42 when the piston 24 is in the second position.

Therefore, the intermittent valve 4 is in a first state of supplying the coating material 18 to the die 2 when the piston 24 is in the first position and is in a second state of stopping the supply of the coating material 18 to the die 2 when the piston 24 is in the second position. More specifically, since the piston 24 is in the first position when the intermittent valve 4 is in the first state, the inflow chamber 38 and the supply chamber 40 communicate with each other, and the inflow chamber 38 and the return chamber 42 are blocked. Therefore, the coating material 18 that has flowed from the feed line 10 into the inflow chamber 38 is supplied to the die 2 via the supply chamber 40 and the die supply line 14. On the other hand, since the piston 24 is in the second position when the intermittent valve 4 is in the second state, the inflow chamber 38 and the supply chamber 40 are blocked, and the inflow chamber 38 and the return chamber 42 communicate with each other. Therefore, the coating material 18 that has flowed from the feed line 10 into the inflow chamber 38 is returned to the tank 6 via the return chamber 42 and the return line 12.

The piston 24 is switched between the first position and the second position by a drive unit (not shown) connected to an end part protruding outside the valve main unit 22. The drive unit includes a motor such as a servomotor and a crank mechanism or the like that connects the motor and the piston 24. The drive unit may be a publicly-known drive source other than a motor such as an air cylinder.

When the piston 24 is displaced from the first position to the second position, the piston 24 moves in the direction in which the piston 24 exits the supply chamber 40. Therefore, the volume of the portion of the piston 24 located in the supply chamber 40 is reduced. Thereby, the pressure inside the supply chamber 40 becomes negative, and a part of the coating material 18 flows back from the die 2. Further, when the supply valve 26 is displaced in the direction in which the supply valve 26 approaches the first connecting part 44 due to the displacement of the piston 24, a part of the coating material 18 is drawn toward the inflow chamber 38 by the supply valve 26. This also causes a part of the coating material 18 to flow back from the die 2. Due to the backflow of the coating material 18, it is possible to prevent the coating material 18 from dripping from the discharge port 84 when the discharge of the coating material 18 from the die 2 is stopped. That is, a suck back effect can be obtained.

In the present embodiment, the dimension of the supply valve 26 is larger than the dimension of the return valve 28. Specifically, the valve diameter D1 of the supply valve 26 is 1.53 times or more the valve diameter D2 of the return valve 28. In other words, the ratio of the valve diameter D1 of the supply valve 26 to the valve diameter D2 of the return valve 28 (D1/D2, this ratio is appropriately referred to as a valve diameter ratio hereinafter) is 1.53 or more. The valve diameter ratio is preferably 1.81 or more and more preferably 2.00 or more. In the present embodiment, the valve diameters D1 and D2 of the respective valves are the sizes of the portions of the respective valves having the largest dimension in the direction orthogonal to the axial direction X of the piston 24.

By setting the dimensions of the supply valve 26 and the return valve 28 such that the valve diameter ratio is 1.53 or more, the amount of coating material 18 drawn back from the die 2 by the suck back effect (hereinafter, this amount is appropriately referred to as a suck back amount) can be increased so as to suppress the scattering of the coating material 18 on the uncoated part 16a.

The present inventors performed intermittent coating using each of an intermittent valve according to a reference example having a valve diameter ratio of about 1.52 and an intermittent valve 4 according to an exemplary embodiment having a valve diameter ratio of 2.00. Then, in the reference example and the exemplary embodiment, the amount (area) of the coating material 18 scattered on the uncoated part 16a was measured by a publicly-known image analysis, and both were compared. As a result, it was confirmed that when the amount of the coating material 18 scattered on the uncoated part 16a in the reference example was set to 1, the amount of the coating material 18 scattered in the exemplary embodiment was reduced to 0.67.

Further, using the intermittent valve according to the reference example, the present inventors set the flow rate (flow velocity) of the coating material 18 to 3.2 L/min and performed intermittent coating. Further, using the intermittent valve 4 according to the exemplary embodiment, the flow rate of the coating material 18 was set to 4.0 L/min, and the intermittent coating was performed. As a result, in the intermittent coating using the intermittent valve according to the reference example, scattering of the coating material 18 on the uncoated part 16a was observed. On the other hand, in the intermittent coating using the intermittent valve 4 according to the exemplary embodiment, it was confirmed that the amount of the coating material 18 scattered was reduced as compared with the reference example even though the flow rate was increased. The suck back amount in the intermittent valve according to the reference example was 0.17 mL, and the suck back amount in the intermittent valve 4 of the exemplary embodiment was 0.22 mL.

In general, as the flow velocity of the coating material 18 increases, the resistance to displacement of the piston 24 from the first position to the second position increases. Therefore, the supply valve 26 is difficult to close, and the coating material 18 is likely to be scattered on the uncoated part 16a. In spite of such a tendency, according to the present embodiment, it is possible to increase the suck back amount so as to suppress the scattering of the coating material 18 on the uncoated part 16a. The present inventors recognizes that the suck back amount can be increased and the scattering of the coating material 18 can be suppressed if the valve diameter ratio is set to be larger than at least that of the reference example, that is, if the valve diameter ratio is set to be 1.53 or more.

Further, the supply valve 26 according to the present embodiment has a first flat part 26*a* extending in a direction orthogonal to the axial direction X of the piston 24 on a surface facing the first downstream end 38*b* side. Further, the valve main unit 22 has a second flat part 22*a* that comes into surface contact with the first flat part 26*a* when the piston 24 is in the second position. The first flat part 26*a* and the second flat part 22*a* are located outside the first downstream end 38*b* when viewed from the axial direction X. Further, the first flat part 26*a* faces upward, and the second flat part 22*a* faces downward such that the first flat part 26*a* and the second flat part 22*a* face each other.

By providing the first flat part 26*a*, when the piston 24 is displaced from the first position to the second position, more coating material 18 can be drawn toward the inflow chamber 38 side. As a result, the suck back amount can be increased more reliably. Further, when the first flat part 26*a* and the second flat part 22*a* come into surface contact with each other while the piston 24 is in the second position, the leakage of the coating material 18 from the inflow chamber 38 to the supply chamber 40 can be suppressed.

Further, when the piston 24 is displaced from the second position to the first position, a narrow (therefore with a large flow path resistance) flow path is formed that is defined by the first flat part 26*a* and the second flat part 22*a* on the outer periphery of the first downstream end 38*b*. Thereby, it is possible to suppress a large amount of coating material 18 from flowing from the inflow chamber 38 into the supply chamber 40 at the moment when the piston 24 is displaced from the second position to the first position. Further, when the piston 24 is displaced from the second position to the first position, the first flat part 26*a* can receive the hydraulic pressure of the coating material 18 flowing out from the inflow chamber 38 to the supply chamber 40. This allows the supply valve 26 to follow the displacement of the piston 24 with higher accuracy. As a result, the supply and non-supply of the coating material 18 to the die 2 can be switched with higher accuracy.

Further, the supply valve 26 has a convex part 26*b* protruding toward the first downstream end 38*b* side in a region closer to the piston 24 than the first flat part 26*a* on the surface facing the first downstream end 38*b* side. While the piston 24 is in the second position, the convex part 26*b* fits into the first downstream end 38*b*. Thereby, the leakage of the coating material 18 from the inflow chamber 38 to the supply chamber 40 can be further suppressed.

Further, at the outer edge part of the surface facing the first downstream end 38*b* side, the supply valve 26 has a taper part 26*c* that is tapered so as to be spaced apart from the second flat part 22*a* toward the outside of the supply valve 26 in a direction orthogonal to the axial direction X. In the intermittent valve 4 according to the present embodiment, the height position of the second opening 32 and the height position of the fourth opening 36 are substantially aligned. Therefore, the supply chamber 40 extends horizontally from the first connecting part 44, then extends upward at a position deviated from the piston 24, and becomes connected to the fourth opening 36. Therefore, when the valve diameter D1 of the supply valve 26 becomes large, the outer edge part of the supply valve 26 may project toward the center side of the supply chamber 40 at a spot where the supply chamber 40 bends in the vertical direction from the horizontal direction, obstructing the flow of the coating material 18. On the other hand, by providing the taper part 26*c*, it is possible to reduce the obstructing of the flow of the coating material 18 in the supply chamber 40 caused by the supply valve 26.

As explained above, the intermittent valve 4 according to the present embodiment is a mechanism for switching between supply and non-supply of the coating material 18 from the tank 6 for storing the coating material 18 to the die 2 for applying the coating material 18 to the coating target 16. The intermittent valve 4 includes a valve main unit 22, a piston 24, a supply valve 26, and a return valve 28. The valve main unit 22 has therein: an inflow chamber 38 that has an upstream end 38*a*, a first downstream end 38*b*, and a second downstream end 38*c* in which a tank 6 is connected to the upstream end 38*a*; a supply chamber 40 that is connected to the first downstream end 38*b* and the die 2; and a return chamber 42 that is connected to the second downstream end 38*c* and the tank 6. The piston 24 is capable of switching between the first position and the second position in the valve main unit 22. The supply valve 26 is fixed to the piston 24, allows the coating material 18 to flow from the inflow chamber 38 to the supply chamber 40 when the piston 24 is in the first position, and blocks the flow when the piston 24 is in the second position. The return valve 28 is fixed to the piston 24, blocks the coating material 18 from flowing from the inflow chamber 38 to the return chamber 42 when the piston 24 is in the first position, and allows the flow when the piston 24 is in the second position. The valve diameter D1 of the supply valve 26 is set to 1.53 times or more the valve diameter D2 of the return valve 28.

By setting the valve diameter D1 of the supply valve 26 to be 1.53 times or more the valve diameter D2 of the return valve 28, the suck back amount of the coating material 18 when the piston 24 is displaced from the first position to the second position can be increased so as to suppress the scattering of the coating material 18 on the uncoated part 16*a*. Thereby, the accuracy of applying the coating material 18 can be improved without complicating the structure of the intermittent valve 4 and even the intermittent coating apparatus 1. Further, the intermittent coating can be speeded up while maintaining the accuracy of applying the coating material 18. Therefore, according to the present embodiment, it is possible to achieve both shortening of the manufacturing time and maintenance of quality of the electrode plates.

Further, the supply valve 26 according to the present embodiment has a first flat part 26*a* extending in a direction orthogonal to the axial direction X of the piston 24 on a surface facing the first downstream end 38*b* side. Further, the valve main unit 22 has a second flat part 22*a* that comes into surface contact with the first flat part 26*a* when the piston 24 is in the second position. The supply valve 26 having the first flat part 26*a* allows the suck back amount to be increased more reliably. Therefore, the accuracy of applying the coating material 18 can be further improved. Further, the first flat part 26*a* and the second flat part 22*a* can suppress the leakage of the coating material 18 from the inflow chamber 38 to the supply chamber 40. Therefore, the accuracy of applying the coating material 18 can be further improved.

Further, the first flat part 26*a* and the second flat part 22*a* can suppress an instantaneous increase in the flow rate of the coating material 18 when the supply valve 26 is opened. Thereby, a sudden increase in the amount of the coating material 18 discharged from the die 2 can be suppressed when the intermittent valve 4 switches from the second state to the first state. Therefore, it is possible to suppress the coating thickness of the coated part 18a from increasing in a boundary region with the uncoated part 16a and make the coating thickness of the coated part 18a uniform.

When the coating thickness of the coated part 18a is made uniform, the entire coated part 18a can be pressed more reliably in press working after the coating step of the coating material 18. Thereby, the density of the entire coated part 18a can be increased, and the entire coated part 18a can be brought into close contact with the coating target 16. As a result, it is possible to suppress the battery performance of a part of the coated part 18a from deteriorating or being peeled off from the coating target 16. Further, the first flat part 26a receiving the hydraulic pressure of the coating material 18 that flows out from the inflow chamber 38 to the supply chamber 40 allows the supply valve 26 to follow the displacement of the piston 24 with higher accuracy. Thereby, the supply and non-supply of the coating material 18 to the die 2 can be switched with higher accuracy, and the accuracy of applying the coating material 18 can be further improved.

The intermittent coating apparatus 1 includes: a tank 6 that stores a coating material 18; a feed line 10 and a return line 12 that connect the tank 6 and an intermittent valve 4; and a pump 8 that is provided in the feed line 10 and that sends the coating material 18 to the intermittent valve 4 from the tank 6. The coating material 18 returns to the tank 6 via the return line 12 when the intermittent valve 4 is in the second state. Thereby, the supply of the coating material 18 to the intermittent valve 4 can be continued even when the discharge of the coating material 18 from the die 2 is stopped. Therefore, since the pump 8 can be constantly driven, the system configuration of the intermittent coating apparatus 1 can be simplified.

Described above is a detailed explanation of the embodiments of the present invention. The above-described embodiments merely show specific examples for carrying out the present invention. The details of the embodiments do not limit the technical scope of the present invention, and many design modifications such as change, addition, deletion, etc., of the constituent elements may be made without departing from the spirit of the invention defined in the claims. New embodiments resulting from added design change will provide the advantages of the embodiments and variations that are combined. In the above-described embodiments, the details for which such design change is possible are emphasized with the notations "according to the embodiment", "in the embodiment", etc. However, design change is also allowed for those without such notations. Optional combinations of the above components are also valid as embodiments of the present invention. Hatching applied to a cross section of a drawing does not limit the material of an object to which the hatching is applied.

In the embodiments, the height position of the second opening 32 and the height position of the fourth opening 36 are aligned, and the supply chamber 40 is bent in the course from the first connecting part 44 to the fourth opening 36. However, the fourth opening 36 may be located below the second opening 32, and the supply chamber 40 may extend linearly in the horizontal direction from the first connecting part 44.

The invention claimed is:

1. An intermittent coating apparatus comprising:
   a tank that stores a coating material;
   a die that applies the coating material to a coating target; and
   an intermittent valve that switches between supply and non-supply of the coating material from the tank to the die,
   the intermittent valve including:
      a valve main unit having therein: an inflow chamber that has an upstream end, a first downstream end, and a second downstream end in which the tank is connected to the upstream end;
      a supply chamber that is connected to the first downstream end and the die; and a return chamber that is connected to the second downstream end and the tank;
      a piston that is capable of switching between a first position and a second position in the valve main unit;
      a supply valve that is fixed to the piston, allows the coating material to flow from the inflow chamber to the supply chamber when the piston is in the first position, and blocks the flow when the piston is in the second position; and
      a return valve that is fixed to the piston, blocks the coating material from flowing from the inflow chamber to the return chamber when the piston is in the first position, and allows the flow when the piston is in the second position,
   wherein a valve diameter of the supply valve is 1.53 times or more a valve diameter of the return valve,
   wherein, when the piston is displaced from the first position to the second position, the piston moves in a direction in which the piston exits the supply chamber, reduces a volume of a portion of the piston located in the supply chamber, generates a negative pressure inside the supply chamber, and causes a part of the coating material to flow back from the die,
   wherein the supply valve is displaced in a direction in which the supply valve approaches a first connecting part connecting the first downstream end and the supply chamber due to displacement of the piston and draws a part of the coating material toward the inflow chamber, thereby causing a part of the coating material from the die to flow back, and
   wherein, due to backflow of the coating material, a suck-back effect can be obtained, whereby the coating material is prevented from dripping from the die when discharge of the coating material from the die is stopped.

2. The intermittent coating apparatus according to claim 1, wherein
   the supply valve has a first flat part extending in a direction orthogonal to an axial direction of the piston on a surface facing a first downstream end side, and
   the valve main unit has a second flat part that comes into surface contact with the first flat part when the piston is in the second position.

3. The intermittent coating apparatus according to claim 1, wherein
   the coating target is a current collector of a secondary battery, and
   the coating material is an electrode slurry of the secondary battery.

* * * * *